(12) United States Patent
Wilson (10) Patent No.: US 6,681,557 B2
(45) Date of Patent: Jan. 27, 2004

(54) LOW COST HIGH EFFICIENCY AUTOMOTIVE TURBINES

(75) Inventor: David Gordon Wilson, Winchester, MA (US)

(73) Assignee: Massachusetts Institute of Technology, Cambridge, MA (US)

( * ) Notice: Subject to any disclaimer, the term of this patent is extended or adjusted under 35 U.S.C. 154(b) by 163 days.

(21) Appl. No.: 10/062,961

(22) Filed: Feb. 1, 2002

(65) Prior Publication Data

US 2002/0124991 A1 Sep. 12, 2002

Related U.S. Application Data

(63) Continuation-in-part of application No. 09/028,409, filed on Feb. 24, 1998, now abandoned.
(60) Provisional application No. 60/038,936, filed on Feb. 24, 1997.

(51) Int. Cl.$^7$ .............................................. F02C 7/105
(52) U.S. Cl. ......................................... 60/39.512; 165/9
(58) Field of Search ......................... 60/39.511, 39.512; 165/8, 9

(56) References Cited

U.S. PATENT DOCUMENTS

| | | | |
|---|---|---|---|
| 2,965,361 A | * 12/1960 | Schwartz | ........................ 165/8 |
| 5,634,339 A | 6/1997 | Lewis et al. | ................... 60/650 |
| 6,141,953 A | * 11/2000 | Mongia et al. | .......... 60/39.512 |

* cited by examiner

Primary Examiner—Louis J. Casaregola
(74) Attorney, Agent, or Firm—Cantor Colburn LLP (57) ABSTRACT

An automotive turbine regenerator system employs sectored matrix elements which are extruded and then assembled into the larger rotary regenerator. Discontinuous rotation is taught such that the seals are not rubbing seals but rather are clamping seals thus radically reducing the leakage and the wear on seal components.

7 Claims, 7 Drawing Sheets

LOW COST HIGH EFFICIENCY AUTOMOTIVE TURBINES

CROSS REFERENCE TO RELATED APPLICATION

This is a continuation-in-part application of U.S. Ser. No. 09/028,409, filed Feb. 24, 1998 (abandoned) which claims the benefit of an earlier filing date from U.S. Provisional Application No. 60/038,936 filed Feb. 24, 1997 which is incorporated herein by reference.

BACKGROUND OF THE INVENTION

In the history of gas-turbine engines, significant work has been done and success had with respect to high-pressure-ratio (HPR) compressors and high-temperature air-cooled turbines. These engines generally do not employ pressure heat exchangers to capture heat from the turbine exhaust, are efficient only when close to full load and employ ratios at well over 10:1. In large engine sizes and at full-load operation, as is common for aerospace use, the engines are extremely effective. Adapting this technology to use in the automobile market, however, yielded difficulties since small compressors could not operate at a maximum compression ratio of 10:1 without suffering penalizing losses in efficiency due to the very small high-pressure passages required and the consequent relatively large blade-tip clearances.

Another problem suffered by those attempting to employ HPR turbines for the automotive market is that automobiles generally run (almost exclusively) at part-load. As was stated hereinabove, the maximum efficiency of HPR engines is obtained at full load. Unfortunately efficiency cannot be maintained by HPR turbines at part-load.

Upon such discovery, engineers turned to lower pressure ratio (LPR) engines (pressure ratios on the order of 4:1) with a heat exchanger. The pioneering exchangers/regenerators were constructed of alternating straight and corrugated strips of stainless steel wound around a mandrel and brazed. The regenerator functioned as intended; however, it did not lend itself to mass production and was far too expensive to produce to compete effectively with spark-ignition engines of the day. Although this initial attempt did not result in an economically feasible construction, research interest did not wane.

Ceramic regenerators appeared to provide desirable characteristics at low enough cost. Unfortunately however, it was found that sulfur and sodium contamination from exhaust and road salt, respectively, caused failures of the then popular lithium-aluminum-silicate ceramic material preferentially used in the heat exchangers. Aluminum silicate and magnesium aluminum silicate were also experimented with and gave superior results. Commonly the regenerators were monolithic and so when damaged by the contaminants noted above or by other means the entire regenerator had to be replaced at not insignificant cost. Unless regenerators could be more reliable and less costly the turbine engine might never be adopted.

Ceramic regenerators of this type also suffered from seal wear. The seals employed had to rub against the outer surface of the disk and wore quickly. Such problems did not reduce interest in ceramic regenerators, however, because the preferred turbine-rotor-inlet temperatures for small turbines had increased to about 1650 K. This temperature coupled with a relatively low cycle pressure ratio gives a turbine expander exit temperatures beyond the melting point of metal heat exchangers. Since at such temperatures, ceramics are the only economically feasible alternative, development continued with respect to the material, manufacturing methods and seals.

Manufacturing of some of the first ceramic regenerators was accomplished by employing the older wrapped-mandrel approach with a ceramic-soaked paper material. Unfortunately however, such methods are neither low cost nor extremely high performance. Performance suffered due to non-optimum passage shapes and spacially non-uniform resistance characteristics. To alleviate this problem, methods of extruding regenerators were developed.

While extrusion is lower in manufacturing cost and reliably provides spacially uniform flow resistance, due to uniform passage size and shape, the extruded regenerators are limited in possible outer dimension simply due to limitations inherent in extruding large objects (300 mm is the largest diameter known to the inventor). Extruding large objects necessitates high pressure even with relatively low-viscosity materials. Ceramic materials found to be preferred in the manufacture of rotary regenerators are not of low viscosity and, therefore, require even higher pressures. This is problematic because of both of rapid frictional wear of the dies and a high incidence of breakage thereof due to stress. Therefore, the extrusion method for forming rotary regenerators of much over 300 mm in diameter (in one piece) has not proved viable. Moreover, if the regenerator were to experience a failure of a part thereof, repair is not an option. The regenerator would need to be replaced. This increases expense to the owner.

Furthermore, single-piece extruded regenerators are limited to a maximum diameter of about 300 millimeters and, therefore, necessarily limit the turbine size to engines below 100 kw or will result in significant compromise in the design parameters of larger engines. Other plaguing problems surrounding a viable regenerator and therefore a workable and economical automotive turbine engine are the seals.

All of the seals known to the inventor to be employed by those working toward an automotive turbine are rubbing seals. By definition, rubbing seals do rub, and consequently wear. Moreover, to reduce the rate of wear of these seals they are utilized in such a manner that they do not clamp against the regenerator surface with a significant enough force to be very pressure containing. Lower clamping force reduces friction which is beneficial in the fight against wear. The drawback of this, of course, is that the seals generally will not hold a large pressure gradient across the seal. The pressure ratio of the machine then is limited and efficiency suffers. Add to this that even with the lower clamping pressure the seals wear at too speedy a rate for competing in the spark-ignition or compression-ignition markets, and the turbine fails to be a desirable option again. In fact, actual leakage rates across these seals frequently increases to over 15% of the compressor air flow in a very short period of time. Loss in overall engine thermal efficiency is approximately at a one-to-one ratio for each point of leakage increase. Advances calculated and proven to effect more efficient regeneration without high leakage are needed before an automotive turbine might become a reality.

On another front, most prototype automotive turbines have employed a single-stage centrifugal (radial) compressor driven by a single-stage axial turbine, followed by a second independent single-stage axial power turbine exhausting into two parallel rotary regenerators. Drawbacks that have plagued development of these engines are that the regenerators discussed above had high leakage and high manufacturing costs. The turbine engines in general had poor peak-load economy and high manufacturing cost. In fact, the cost of manufacture has been several times greater than for spark-ignition engines.

Creating viable engines optimally suited for automotive use requires minimization of the above identified drawbacks and shortfalls of prior art engines.

SUMMARY OF THE INVENTION

The above-discussed and other drawbacks and deficiencies of the prior art are overcome or alleviated by the engine and regenerator of the invention.

Alleviation or eradication of the regeneration problems for automotive turbine engines of the past is accomplished by providing a multiple-sectored or more properly, multiple-sectored regenerator assembleable into one or two regenerator disks. In this manner a large disk may be assembled by extrusion methods since each sector, which is much smaller by itself, is individually extruded. The matrix is also extrudable in small assembleable sectors. The regenerator sectors are either extruded in a shell and matrix combination or in a separate manner with the matrix sized to fit within the shell. Alternatively the matrix elements may be stamped. Alternatively, the matrix may be of foamed ceramic, sintered spheres, wires or rods or other materials having flow through capability in order to function as a rotary regenerator material as described herein or otherwise known. Significant advantages both in cost and function of the disk are realized.

Engine design having multiple compressor stages and multiple turbine stages at a low pressure ratio in combination with the regenerator described herein, is in a different direction from the prior art. The invention employs an axial-flow-turbine design, at a low pressure ratio which, of course, also dictates a low peripheral speed of the rotors. Additional savings are realized in materials themselves and in the sizes or thicknesses of the components as a direct consequence of the lower pressure and speeds of the multistage engine of the invention.

The invention produces simultaneously higher thermal efficiencies, particularly at part load (the common condition of operation of engines in automobiles), reduces stresses on components thus increasing longevity, and allows the use of low-cost materials to lower the total initial cost of the engines.

The above-discussed and other features and advantages of the present invention will be appreciated and understood by those skilled in the art from the following detailed description and drawings.

BRIEF DESCRIPTION OF THE DRAWINGS

Referring now to the drawings wherein like elements are numbered alike in the several FIGSURES.

DETAILED DESCRIPTION OF THE PREFERRED EMBODIMENTS

As the rotary regenerator of the invention may be employed with any turbine engine and not simply the preferred automotive turbine engine of the invention, it is discussed first. Two major embodiments are preferred for the rotary regenerator of the invention. In the broadest sense, the embodiments are founded upon either a shell and matrix that are not contiguous and those that are contiguous. More specifically, the sectors are either formed by an integral shell and matrix or are formed separately and are then assembled. In the first embodiment a sectored shell is formed preferably by extrusion but could also be by any other commercial process capable of producing a part with high dimensional accuracy and the matrix to be added there within is either extruded or stamped. Stated somewhat differently, each segment of the shell, and its corresponding matrix segment, may be extruded individually. The second embodiment employs extrusion or other commercial process to produce each sectored piece as a unit comprising a shell portion and matrix portion. Construction of the embodiments is discussed first with benefits and the preferred method for using the products following.

Figure 1:
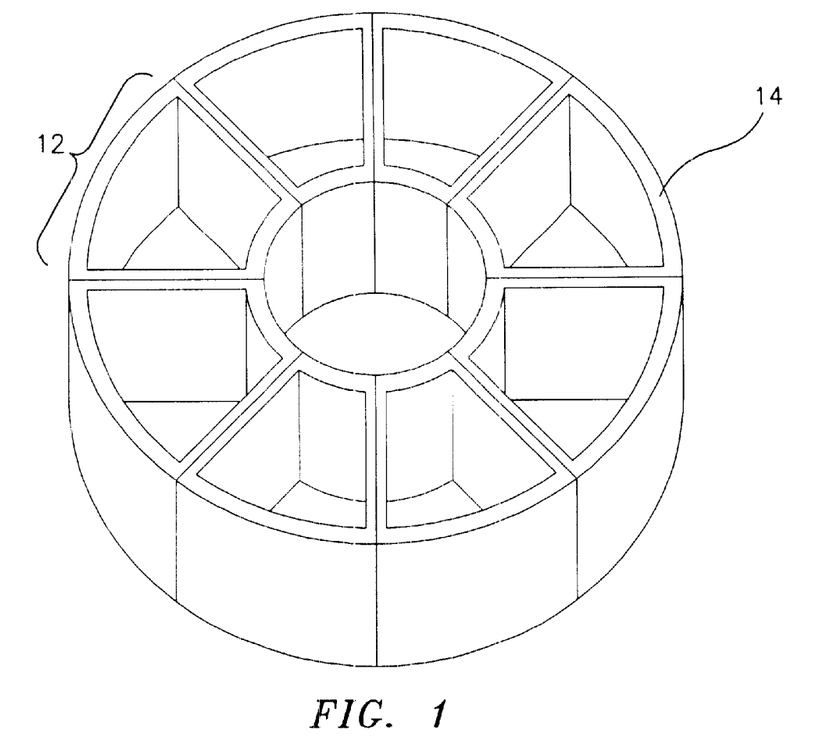
FIG. 1 is a perspective view of the shell assembly of the rotary regenerator of the invention.

Referring to FIG. 1, one of ordinary skill in the art will appreciate a sectored appearance, (each sector 12 being a truncated pie-shaped section) of the "shell" of the regenerator. In the first preferred embodiment of the regenerator the shell sectors 12 are extruded, preferably of ceramic material.

By extruding the smaller sectored pieces, whether as separate shell 14 and matrix 16, or as a unit discussed infra, lower pressures are required to move the material of choice through the extrusion die. This promotes a lower-stress environment for the die and increases longevity thereof. Moreover, the cost of manufacture drops due to the smaller parts and the avoidance of the limitations on size of the regenerator as discussed supra in the background of the invention section. Thus, truly effective regenerators for automotive-sized applications are produced.

Figure 1A:
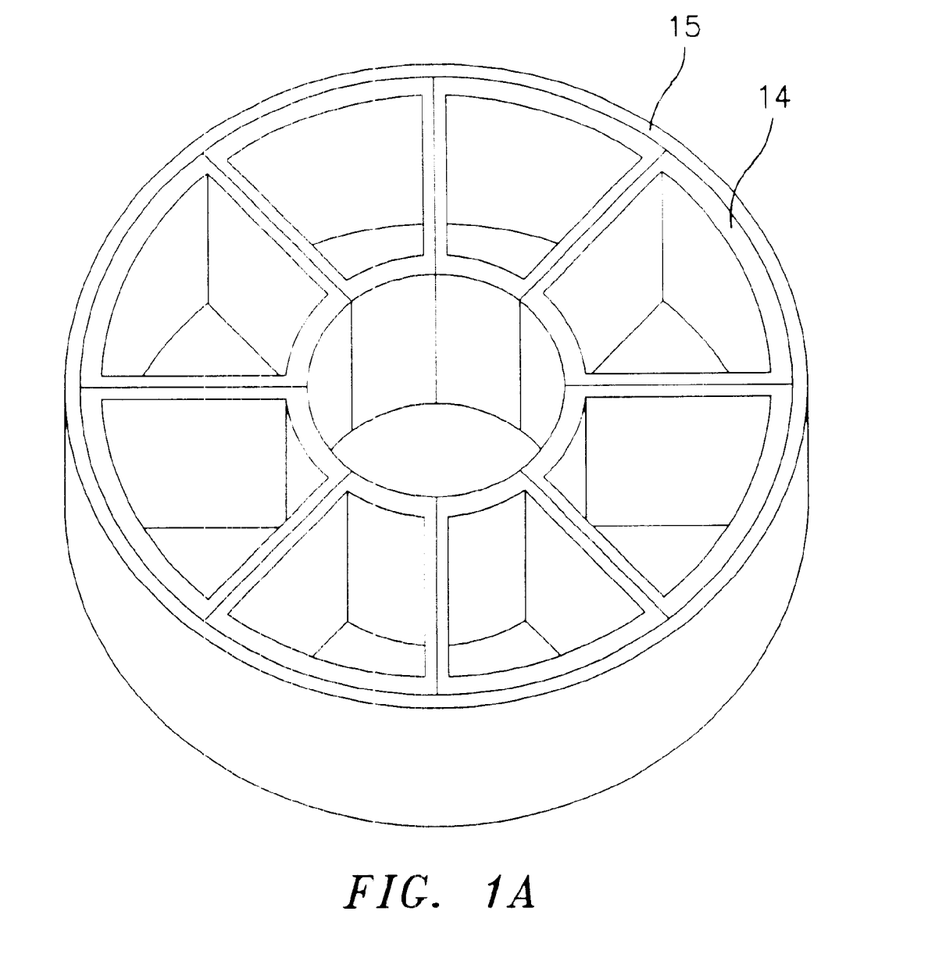
FIG. 1A is a perspective view of the shell assembly of the invention assembled in a container.
Figure 2:
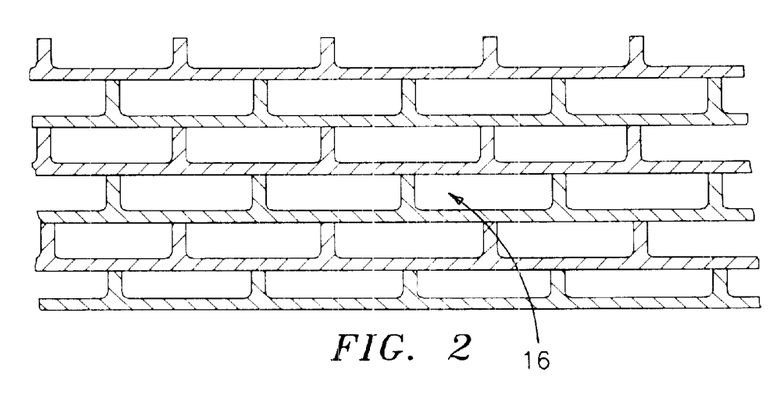
FIG. 2 is a schematic view of a fin-shaped matrix portion of the invention.
Figure 3:
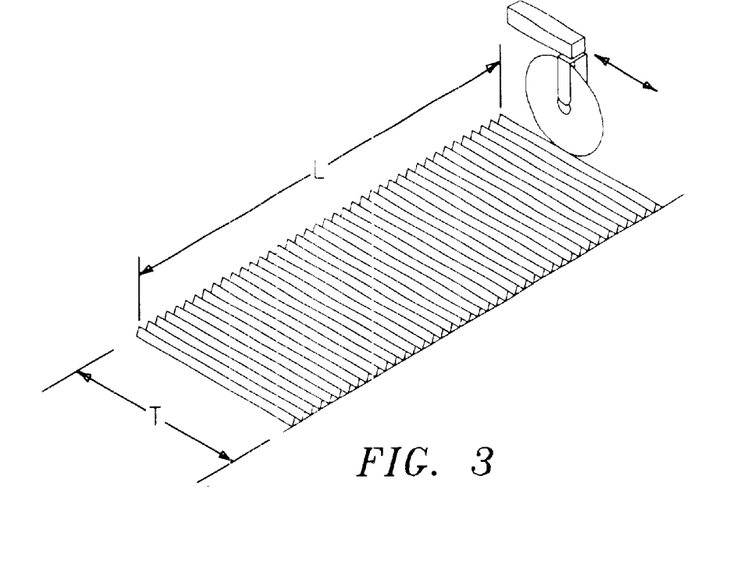
FIG. 3 is a perspective view of the stamped matrix material with schematic cutter to illustrate orientation of cutting thereof.
Figure 4:
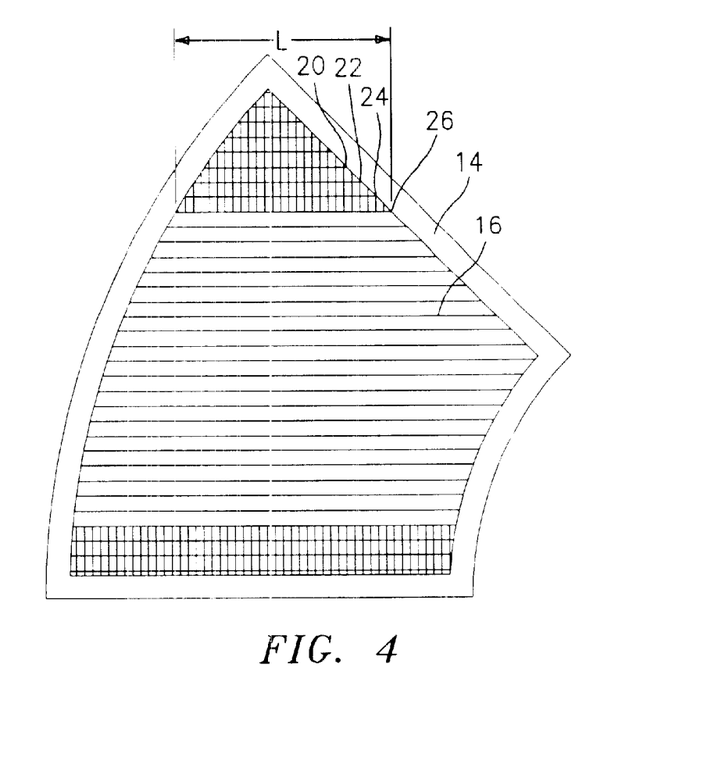
FIG. 4 is a plan view of the material in the shell sector.

Each of the sectors are assembled to form a whole regenerator; two iterations are an eight-sector or twelve-sector regenerator. Sectors are maintained in the desired form by one or two circumferential bands or container 15 (see FIG. 1A) or by cement adhesives. The matrix portion is either extruded or stamped from materials such as but not limited to cordierite and silicon carbide in preferably low-cost elements such as pressed or calendered strips of finned sections (FIG. 2). In the embodiment illustrated in FIG. 3, these are inserted in the shell 14. The matrix is preferably built-up in the sector by cut sections of the finned material. The finned material is illustrated in FIG. 3 in bulk form and then cut and installed-in-shell form in FIG. 4. It should be appreciated that each layer of finned material 20, 22, 24, 26 is a different length in direction L (illustrated in FIG. 4) since the inverted frustoconical section shape narrows radially inwardly The matrix 16 in one embodiment comprises rectangular or square passages having a hydraulic diameter $d_h$ of about 0.5 to about 1.25 mm (where $d_h$ is defined as 4× passage cross-sectional area/passage perimeter). The actual values of $d_h$, matrix thickness (flow length) flow areas normal to the passages, etc, may be found from references "The Design of High-Efficiency Turbo-Machinery and Gas Turbines"by D. G. Wilson & T. P. Koriakinitis, Prentice Hall (1998) and "Gas Turbine Regenerators" by Douglas Stephen Beck and David Gordon Wilson, Chapman and Hall (1996), both of which are incorporated herein by reference. Preferred porosity regardless of matrix type is about 0.7. The matrix in FIG. 2 has been found to provide a porosity of about 0.7.

Figure 4A:
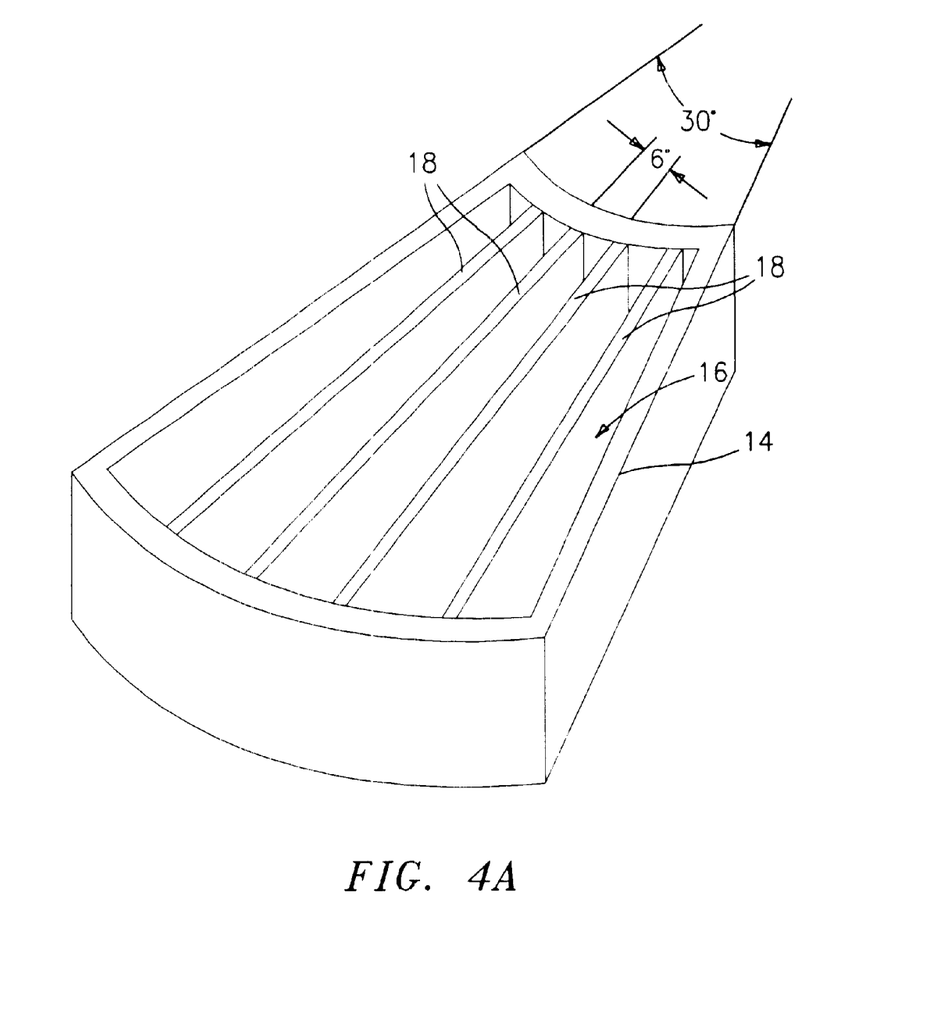
FIG. 4A is a perspective view of a single sector with porous ceramic core material and multiple partitions.
Figure 5:
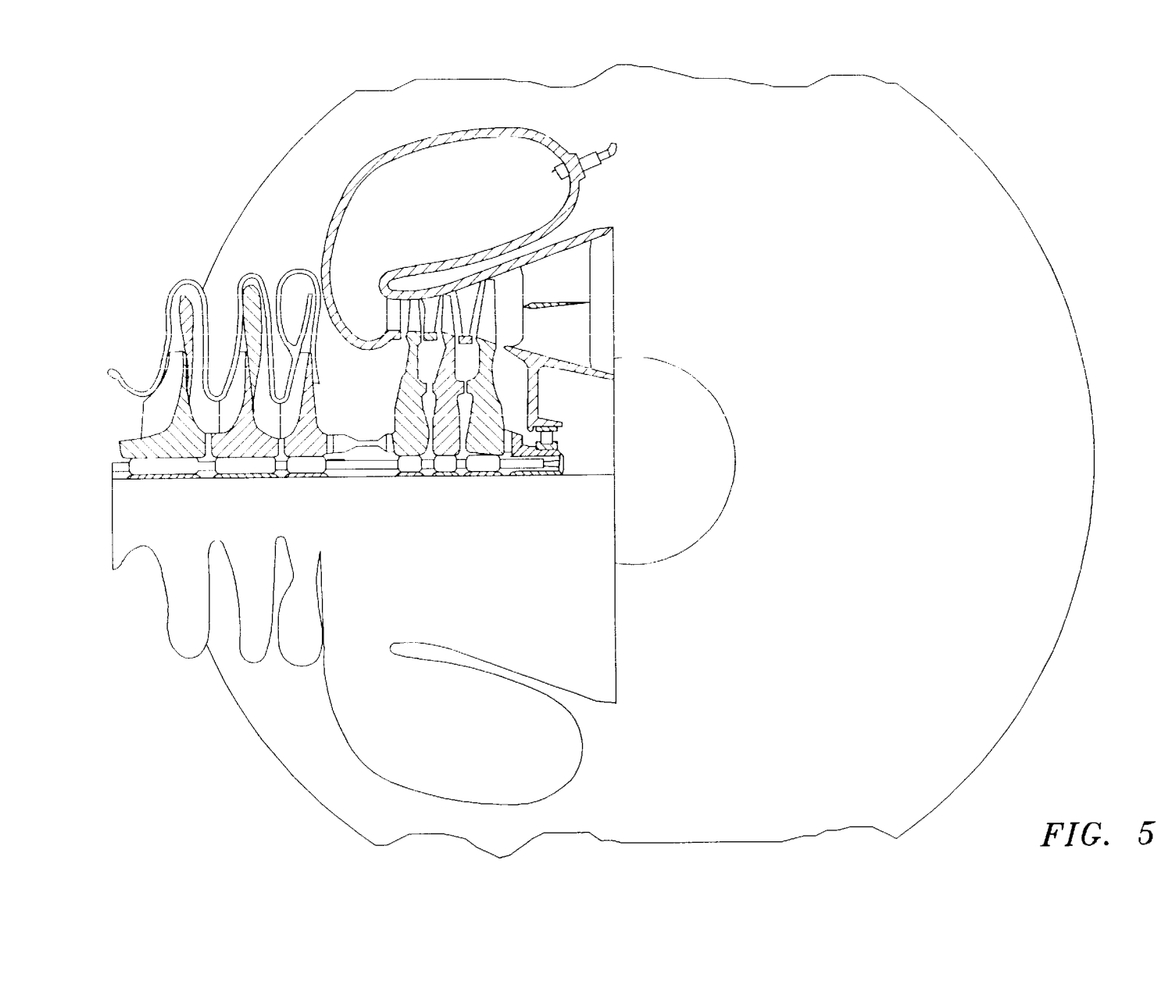
FIG. 5 is a schematic cross section of the turbine engine of the invention.
Figure 6:
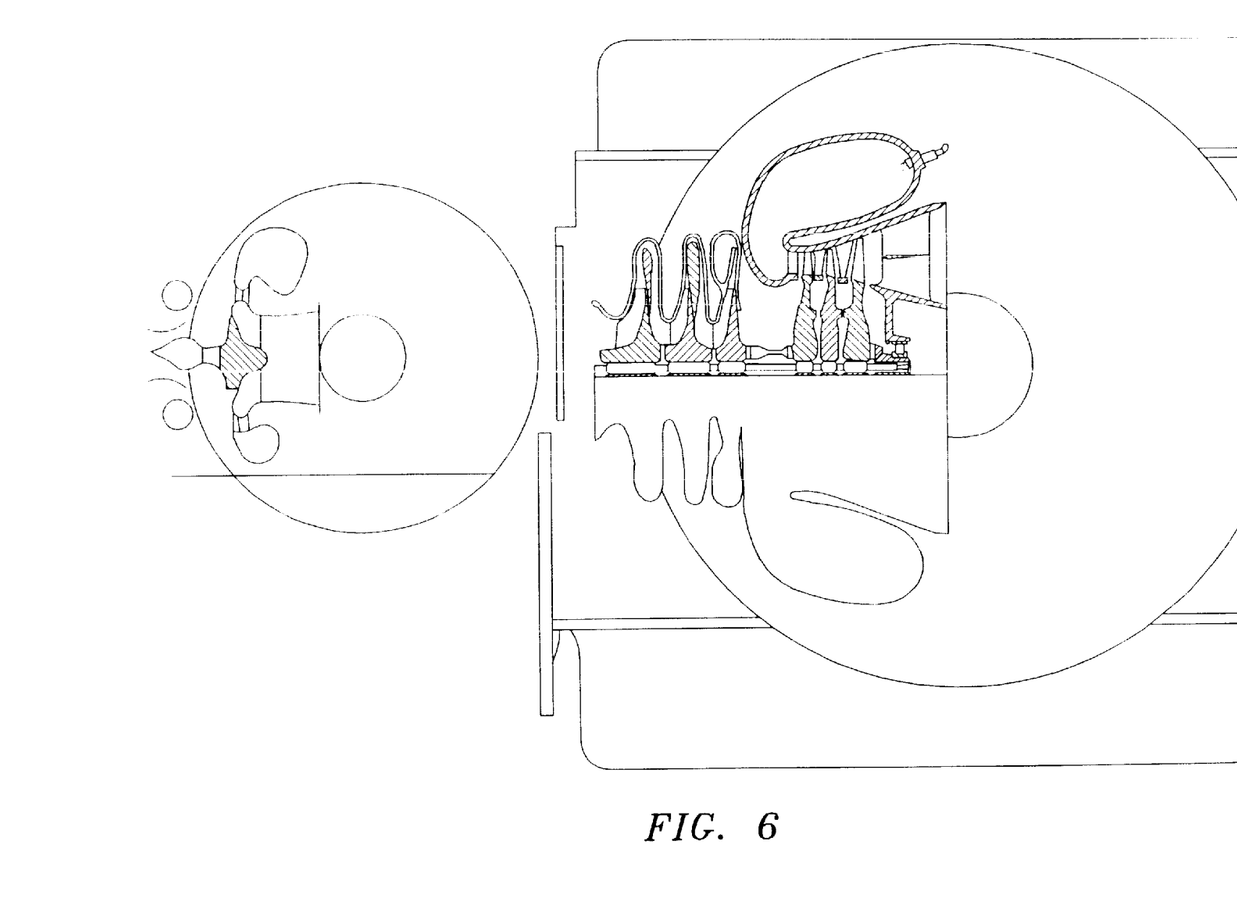
FIG. 6 illustrates the view of FIG. 5 superimposed upon a conventional spark ignition engine of comparable horsepower.

Other suitable matrix configurations include honey combs, foamed ceramics, sintered wire, sintered rods or sintered spheres. Similar to the foregoing embodiment, honey comb matrixes are inherently resistant to transverse flow. Resistance to transverse flow is a benefit; however, both of these tend to be more expensive than configurations such as the porous matrix materials listed above (the list is exemplary, not exhaustive). While the less expensive configurations are advantageous in that because of their economy, they do allow transverse flow to occur. Since transverse flow is undesirable in the regenerator described and claimed herein, an embodiment that employs matrix configurations susceptible to transverse flow is provided with one or more partitions 18 as illustrated in FIG. 4A.

Partitions 18 are to be substantially if not completely restrictive to transverse flow of fluid and must be capable of withstanding the environment where high temperatures and differential thermal expansion are common. Partitions 18 may be constructed of ceramic materials having properties similar to the material employed for the matrix while additionally being inhibitive of fluid flow in a transverse direction relative to the intended flow direction of the regenerator, and range in thickness from about 0.25 mm to about 1 mm in thickness. As stated one or more of these partitions are employable in each sector. As each sector in one embodiment is 30° of arc, a single partition is potentially placed at 15° depending upon how many partitions will be used for each sector they may be placed at 15, 10, 5 or 3 degrees to create 2, 3, 6 or 10 sub-sectors. Partitions 18 may be constructed or effected by constructing each sub-sector as its own component or by mechanically inserting a partition of a suitable material into provided recesses in a fall width sector (in one embodiment about 30 degrees of arc).

Where each sub-sector is individually manufactured 2, 3, 6 or 10 (or other number if the sub-sectors are not to be equal) are then assembled into one sector (assuming a 30 degree sector). These individual sub-sectors are manufactured with fluid flow inhibited transverse surfaces, which thus prevent the transverse flow desired to be controlled. Fluid flow inhibited transverse surfaces may be created by spraying a slurry on the transverse surfaces of the porous matrix to create the non porous surface and then firing the same. Alternatively, where a mold is to be employed to manufacture the porous matrix sub-sector, the walls of that mold may be coated with a drier stiffer mix of the same 'green' ceramic material, of cordierite, mullite, aluminum silicate or other of many possible choices which at least after firing, will be inhibitive of transverse flow. This coated mold is then employed to receive the formed (or other) ceramic material. Upon firing the coating and the matrix material are joined and the sub-sector is complete. Yet another embodiment employs extrusion of a suitable ceramic material (or the material having suitable properties) in a shape of a sub-sector perimeter. A matrix material is then installed in the sub-sector perimeter each of these alternative embodiments produces sub-sector sized components having porous matrix material and fluid flow inhibited transverse surfaces. Upon assembly of these sub-sectors into a complete sector, the fluid flow inhibited transverse surfaces constitute partitions 18. In yet another embodiment, an extruded planar material is placed at the transverse surfaces of the matrix and when fired is made permanently affixed thereto. This planar material is of course, inhibitive to transverse flow of fluid.

In another method of effecting partitions 18, a sector as described hereinbefore is provided with recesses, which are about 80% to about 90% of the axial thickness of the sector for receiving partitions. Planar partitions, which may be of the same constitutions as the material of the matrix, are inserted into such recesses and the sector is fired. The recesses provided for this embodiment may be sawn or otherwise machined into the green matrix material or may be formed therein.

In the second embodiment the shell 14 and matrix 16 are formed together, preferably by extrusion but also by other commercial processes. Of course, many particular matrix geometries are possible without departing from the scope and spirit of the invention so long as a sectored regenerator is employed or constructed.

Whether with respect to the first or second embodiments of the invention, the sectors (truncated pie-shaped slices) provide certain significant advantages over the prior art. Firstly, as stated above, the sectored regenerator allows construction of large regenerators while relying on low-cost technology (i.e. extruding small parts). Secondly, the sectored construction itself reduces thermal stresses (stresses created by the thermal expansion coefficient.) This is because individual sectors or even areas can expand without affecting other areas which are not in an expansion environment. More specifically, since the sectors are separate structures and thus the full regenerator is not a single rigid member, they are capable of small shifts relative to one another during use. Stresses that would occur in temperature transition areas are thus avoided.

Another important benefit of the sectored regenerators of the invention is that if a single sector is damaged or clogged it can be replaced individually at a substantially reduced cost to that of prior art monolithic disks which must be replaced in their entirety even if only a small section is damaged. The invention contemplates a casing opening for access to the regenerator for repair. The regenerators (rotors) of the invention may be assembled into disk, drum or cone shapes, preferentially, and may embody other shapes without departing from the scope of the invention.

Figure 7:
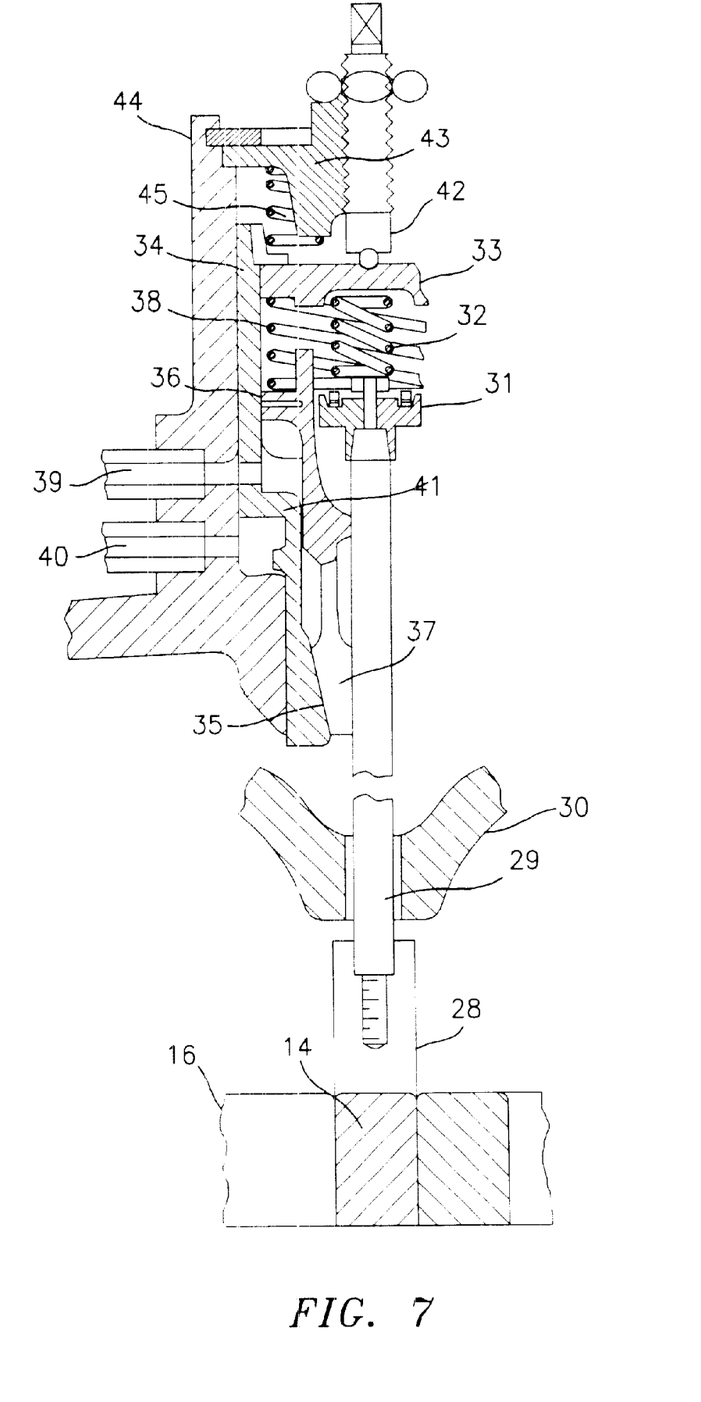
FIG. 7 is a schematic cross section of the seal lifter mechanism of the invention.

A second problem with rotary regenerators was noted in the foregoing background section; rubbing seals leak. Thus, a second aspect of the present invention is a seal lift system to relieve substantially all of the clamping force on the seals so that wear is avoided. The inventor hereof has eliminated rubbing seals by providing a clamping system which clamps the seals against the regenerator tightly only when the regenerator is in a state of rest, said rest being occasioned by discontinuous rotation of the regenerator in use. Referring to FIG. 7 the seal lift mechanism of the invention is illustrated. In the invention, discontinuous rotation (A related invention is described in U.S. Pat. No. 5,259,444 to Wilson the entirety of which is incorporated herein by reference) is employed in increments of preferably about 30 or about 45 degrees. The rotation takes place under relaxed sealing pressure so that the seals do not wear. Seal wear, is of course, a function of seal clamping pressure. The reduction in seal clamping pressure is preferably created by an outward movement of the seals of about 25 to about 250 microns (about 0.001 to about 0.010 inch) caused by the seal-lift mechanism an instant before incremental rotation of the regenerator. A diagrammatic cross-sectional representation of the seal-lifter mechanism is shown in FIG. 7. Seal 28 is illustrated in the position in which it is pressed onto a section of the regenerator shell 14 enclosing matrix 16. The actual seal material is of less importance in the lift-off sealing arrangement than for a rubbing-seal mechanism because the seat generally is not subjected to any frictional wear and so does not require wear resistant characteristics. The seal could be graphite for the cold side, and stainless steel, ceramic or other high-temperature material having a degree of flexibility so that it can be forced to conform onto the shell 14 surface by a spaced series of seal-lifter mechanisms in case the matrix face becomes non-flat. The sealing force is transmitted by rod 29 passing through a flow-control casing 30, and terminating in a spring seat 31 fastened appropriately to the rod 29. The sealing force is provided by spring 32, the outer end of which presses on disk 33. This disk is held on a shoulder 34 of a cylindrical component 41 that at its lower end carries an internal taper 35. A piston 36 slides in the cylindrical component 41 and has a tapered-jaw collet 37 at its seal end that engages the taper 35 and, when forced into the taper engagement, grips the seal rod 29. The gripping force is normally provided by spring 38. Its action, however, can be negated by the admission of high-pressure air through pipe 39.

During seating of the seal, high-pressure air will be connected to pipe 39 so that the seal 28 is pressed on shell section 14 through the action of the spring 32. Then the high-pressure air will be vented from pipe 39 so that spring 38 causes the collet 37 to grip the seal rod 29 at whatever position it has taken up. When the seal is to be lifted, just before rotation of the shell 14 and matrix 16 through a preset increment, high-pressure air is admitted to pipe 40, which acts to lift the cylindrical piece 41 together with the collet 37 and the seal rod 29 and seal 28. This whole assembly moves "up" (in the sense of FIG. 7) until the disk 33 hits the present stop 42, threaded in the spring carrier 43, that provides a retaining position for the return spring 45, and is fastened appropriately in the casing member 44. The gap between disk 33 and stop 42 can be preset at, for instance, 25 or 50 microns, to give the amount by which the seal will be lifted from whatever position it takes up when the seal 28 is pressed onto the shell 14 by the spring 32. This will occur when high-pressure air is vented from pipe 40, allowing the return spring 45 to move the seal assembly towards the matrix shell 14. High-pressure air must at the same time be admitted to pipe 39 to release the collet 37 in case the new resting position of the seal 29 on the shell 14 is different.

A plurality of lifting mechanisms are employed on each regenerator to provide lifting and clamping forces along the seals preferably at spacings of about 50 to about 150 mm. As was indicated herein the preferred numbers of sectors are 8 or 12. In one embodiment, the sectors 14 discussed above are grouped in a unit of three sectors to comprise the high pressure fluid passage. The three sectors together, comprise the same angle of arc in the perimeter of the regenerator as that contemplated for rotation of the regenerator in one increment. The engine aspect of the invention employs a lightly loaded axial turbine having a "work coefficient" only 65% higher than that of a radial turbine. Therefore the turbine based engine of the invention yields a higher efficiency than either a radial turbine or a more highly loaded axial turbine. In conjunction with this, the invention employs a low peripheral speed which helps to avoid erosion and allows the use of lighter components in the engine. Indeed, for prior-art engines, peripheral speeds of well over 700 m/s required that a grain of sand trying to move toward the outlet of the turbine near the rotor axis would have to attain an inward acceleration of a half million times that of gravity. As one of skill in the art recognizes this is highly unlikely and, therefore, the grain of sand causes erosion instead of being exhausted from the engine. Using low peripheral speeds of about 300 m/s, due in part to the multi staging advocated herein, in addition to the adoption of axial turbines, eliminates the problem virtually completely. This makes the likelihood of expulsion of the exemplary grain of sand much higher. Moreover, steady-state centrifugal stresses are reduced which again creates savings in material and enhances longevity of the engine. (Centrifugal stress is avoided because, other aspects being identical, they are proportional to the square of the peripheral speed. Furthermore, because of the low-pressure, low-peripheral-speed and multistage design, lower-cost materials such as carbon-fiber-reinforced plastics (CFRP) or die-cast metals such as magnesium or aluminum alloys may be employed in the compressor stages of the engine without detrimental effect or loss of longevity. In fact, even with the stress and temperature rise of a hot shut-down "soak-back" the materials in the engine are not detrimentally affected because of the low thermal capacity of low-density ceramics. Overall stresses of the three-stage design drop to about one ninth of that in a single-stage design. Because of this advantage, and the consequent availability of lower-cost materials as discussed, such production costs of the multiple-stage engine would be decreased over those for producing a single-stage engine. One inexpensive material, for example, mullite, can be used for the rotors in this construction without detrimental effect. Low peripheral speeds also allow for the outer casing of the engine to be reduced in thickness and/or even made from less expensive materials because the burst energy and kinetic energy are both substantially reduced. Thus, the casing need not be capable of containing the kinetic energy of a high-peripheral-speed machine in a breakup.

The three compressor stages of the invention although it is larger (about twice the diameter) than that of a single-stage compressor rotor, provides significant advantages on several fronts: 1) the CFRP that is employable in the invention for reasons stated above, has a density that is about half that of the aluminum alloy required for a single-stage compressor; and 2) the moment of inertia developed by the three-stage compressor is about twelve times that of a single-stage engine. The rotating speed of the three stage engine, however, is only about one-fifth that of the single stage machine. The rotating kinetic energy is therefore reduced by over 50%. Thus, even if no advantage is taken relative to the lower stresses experienced by the engine such as employing reduced thicknesses of individual parts, the engine still benefits from the significant advantage of a speedier engine response time.

The engine and rotary regenerator of the invention also produce a 20% gain in fuel efficiency at full-load conditions and even better at part-load conditions over the prior art turbine engines (which, as stated above, is the condition at which automotive engines run almost exclusively).

While preferred embodiments have been shown and described, various modifications and substitutions may be made thereto without departing from the spirit and scope of the invention. Accordingly, it is to be understood that the present invention has been described by way of illustration and not limitation.

What is claimed is:

1. An engine comprising:
   a multiple-stage low-pressure-ratio turbine;
   a multiple-stage low-pressure-ratio compressor in operable communication with said turbine;

a sectored rotary regenerator;

means for discontinuously rotating the rotary regenerator; and a seal system having a plurality of seals in communication with said regenerator, said seal system releasing said seals from contact with said regenerator before said discontinuous movement of said regenerator and clamping said seals against said regenerator after said discontinuous movement of said regenerator has terminated.

2. An engine as claimed in claim 1 wherein said turbine is a three-stage turbine.

3. An engine as claimed in claim 1 wherein said compressor is a three-stage compressor.

4. An engine as claimed in claim 1 wherein said rotary regenerator consists of ceramic material.

5. An engine as claimed in claim 4 wherein said ceramic material is silica nitride, cordierite, mullite, magnesetun alumina silicate, aluminum silicate and combinations containing at least one of the foregoing.

6. An engine as claimed in claim 1 wherein said multiple stage compressor includes compressor stages comprising one of carbon fiber reinforced plastics, die cast metals and combinations including at lest one of the foregoing.

7. An engine as claimed in claim 6 wherein said die cast metals are one of magnesium and aluminum and combinations including at least one of the foregoing.

* * * * *